United States Patent [19]

Cort

[11] 4,355,024

[45] Oct. 19, 1982

[54] METHOD AND FEED FOR STIMULATING THE GROWTH OF ANIMALS

[76] Inventor: Joseph H. Cort, 300 E. 54 St., New York, N.Y. 10022

[21] Appl. No.: 6,799

[22] Filed: Jan. 25, 1979

[51] Int. Cl.$^3$ .............................................. A61K 37/00
[52] U.S. Cl. .................................................. 424/177
[58] Field of Search ........................................ 424/177

[56] References Cited

PUBLICATIONS

Chem. Abstr. vol. 85 (1976) 175700k.

*Primary Examiner*—Frederick E. Waddell
*Attorney, Agent, or Firm*—Kenyon & Kenyon

[57] ABSTRACT

The growth of animals such as swine and cattle is stimulated by feeding them feed including the methyl ester of aspartyl-phenylalanine in an amount sufficient to stimulate growth, typically in an amount of from about 0.01 to about 1 weight percent.

5 Claims, No Drawings

METHOD AND FEED FOR STIMULATING THE GROWTH OF ANIMALS

The present invention is concerned with stimulating the growth of animals. More particularly, the present invention is concerned with an additive for animal feed which stimulates the growth of animals consuming such feed.

BACKGROUND

Growers of livestock, in particular livestock intended for human consumption, have long sought ways of stimulating the growth of such livestock. For example, steroids such as diethylstilbestrol (DES) have been employed as feed additives in an effort to stimulate growth. As is now well known, the use of steroids has been implicated in the formation of certain tumors, and hence is undesirable. Another approach has been to add sugar (sucrose) to animal feeds to increase the palatability of the feed, and thereby induce the animal to increase its feed intake per unit time. However, the use of sugar materially increases the carbohydrate caloric content of the feed, and thus leads to increased fat formation in the animal.

DESCRIPTION OF THE INVENTION

It is an object of this invention to provide an improved animal feed additive for stimulating animal growth.

It is a further object of this invention to provide a non-carbohydrate growth stimulating feed additive.

Still a further object of this invention is to provide a method for stimulating growth through the use of a peptide.

These and other objects of this invention, which will be evident from the ensuing specification and claims, are achieved through the addition of the methyl ester of aspartyl-phenylalanine to an animal feed in an amount sufficient to stimulate the growth of the animal consuming the feed.

The methyl ester of aspartyl-phenylalanine has been known for quite some time. It was first disclosed in Belgian Pat. No. 665,591 published Dec. 17, 1965, as a member of a large group of oligopeptides claimed to possess anti-inflammatory action. More recently, it was discovered that the methyl ester of aspartyl-phenylalanine is a highly potent sweetener, having a taste similar to that of sucrose but being some 250 to 350 times as potent on an equivalent weight basis. This is disclosed in U.S. Pat. No. 3,475,403 issued Oct. 28, 1969 and in French Pat. No. 1,554,088 granted Dec. 9, 1968. As is disclosed in U.S. Pat. No. 3,475,403, the stereo isomers wherein at least one peptide is in the L-configuration are especially sweet. Accordingly, the use of the methyl ester of L-aspartyl-L-phenylalanine is preferred. However, use of the D-L or L-D isomers, or a racemic mixture is within the scope of this invention.

The use of the methyl ester of aspartyl-phenylalanine as an animal growth supplement offers several advantages. First, it has a very low caloric value, and thus, it does not lead to the formation of fat as does sugar. Furthermore, it can be employed in amounts much smaller than sugar, and thus the overall cost of the growth supplement is reduced. Finally, it is formed of naturally-occurring peptides, and hence can be expected to be free of undesirable side effects, such as have been associated with artificial sweeteners such as cyclamates, saccharine and steroids such as DES.

In accordance with this invention, the methyl ester of aspartyl-phenylalanine is admixed with animal feed in an amount sufficient to stimulate growth. The precise amount is not highly critical to the invention, and will depend upon the animal species, the type of feed, and the growth rate desired. It is believed that the methyl ester of aspartyl-phenylalanine acts by increasing the spontaneous food intake of animals, possibly by its sweetening effect. As a general rule, however, the amount added to the animal feed need not exceed about 1 weight percent, and ordinarily can vary from about 0.01 to about 1 weight percent. Amounts of from about 0.1 to about 0.5 weight percent are preferred.

The composition of the animal feed is not a feature of this invention. It obviously will differ depending upon the animal in question, and can comprise natural feeds as well as prepared feeds such as animal chows and the like. Ordinarily the feed will contain a source of protein, a source of carbohydrate, and optionally added minerals and/or vitamins.

The present invention may be employed to stimulate the growth of any animal; however, it is of especial value in stimulating the growth of animals raised for the production of meat, and in particular swine and cattle. For maximum benefit, the treated feed is supplied to the animal during its growing phase. When this is done, substantial increases in weight are achieved in comparison with animals fed a comparable diet without the added methyl ester of aspartyl-phenylalanine.

The following example, in which the growth-stimulating effect of the methyl ester of aspartyl-phenylalanine is demonstrated in common laboratory animals, in this case laboratory rats, is illustrative of the present invention.

EXAMPLE

Two groups of 10 Wistar strain rats each, all males to avoid estrus cyclical changes in the 15-day experimental period, were kept in two separate stock cages in an animal room maintained at 25° C. with an automatic 12-hour light-12-hour-dark cycle. Dry standard laboratory chow pellets were made up into a wet mash by adding a 1:1 mixture of water (wt/wt), which then was compressed by hand into balls weighing approximately 20 grams each. To each 20 g ball made for the experimental group, 50 mg of the methyl ester of L-aspartyl-L-phenylalanine was added, which represents a 0.25% wt/wt admixture. More than adequate food was made freely available to the animals at all times and drinking water was made available ad libitum. All individual rats were numbered by a colored stripe system marked on the tail. The animals were weighed on a balance to an accuracy of 1 gram at the start of the experiment (3 days after arrival in the cages to allow them to adjust to their new environment). They were then weighed again after 2, 4, 6, 8, 10, 12 and 14 days from the start of the new diet (i.e., days 3, 5, 7, 9, 11, 13 and 15 of the experiment). The rates of growth of the control and experimental animals is summarized in tabular form below:

| Control Animals | Body Weight of Animals, grams | | | | | | | |
|---|---|---|---|---|---|---|---|---|
| | Day 1 | Day 3 | Day 5 | Day 7 | Day 9 | Day 11 | Day 13 | Day 15 |
| 1 | 102 | 112 | 122 | 131 | 142 | 150 | 162 | 170 |
| 2 | 110 | 118 | 127 | 138 | 149 | 160 | 168 | 176 |

-continued

| Control Animals | Body Weight of Animals, grams | | | | | | | |
|---|---|---|---|---|---|---|---|---|
| | Day 1 | Day 3 | Day 5 | Day 7 | Day 9 | Day 11 | Day 13 | Day 15 |
| 3 | 98 | 108 | 118 | 127 | 138 | 146 | 158 | 166 |
| 4 | 105 | 115 | 124 | 135 | 143 | 155 | 164 | 173 |
| 5 | 92 | 103 | 112 | 123 | 134 | 143 | 155 | 162 |
| 6 | 115 | 123 | 134 | 142 | 153 | 161 | 172 | 180 |
| 7 | 108 | 118 | 127 | 136 | 148 | 154 | 166 | 175 |
| 8 | 90 | 98 | 110 | 118 | 127 | 138 | 145 | 157 |
| 9 | 104 | 113 | 120 | 131 | 140 | 152 | 159 | 167 |
| 10 | 95 | 104 | 115 | 122 | 134 | 143 | 152 | 165 |
| Mean Body Weight | 101.9 | 111.2 | 120.9 | 130.3 | 140.8 | 150.2 | 160.1 | 169.1 |
| Standard Deviation | 8.1 | 7.8 | 7.4 | 7.7 | 7.9 | 7.6 | 8.0 | 7.0 |

| Experimental Animals | Body Weight of Animals, grams | | | | | | | |
|---|---|---|---|---|---|---|---|---|
| | Day 1 | Day 3 | Day 5 | Day 7 | Day 9 | Day 11 | Day 13 | Day 15 |
| A | 94 | 112 | 130 | 148 | 169 | 184 | 203 | 220 |
| B | 105 | 119 | 135 | 153 | 160 | 188 | 204 | 223 |
| C | 96 | 110 | 126 | 143 | 161 | 180 | 195 | 211 |
| D | 110 | 128 | 145 | 161 | 178 | 193 | 209 | 226 |
| E | 102 | 120 | 134 | 150 | 166 | 183 | 202 | 217 |
| F | 98 | 112 | 127 | 143 | 158 | 172 | 186 | 201 |
| G | 104 | 119 | 134 | 149 | 165 | 181 | 200 | 215 |
| H | 95 | 109 | 124 | 140 | 155 | 169 | 184 | 198 |
| I | 114 | 129 | 145 | 162 | 180 | 197 | 213 | 227 |
| J | 108 | 120 | 134 | 149 | 166 | 184 | 203 | 221 |
| Mean Body Weight | 102.6 | 117.8 | 133.4 | 149.8 | 166.8 | 183.1 | 199.9 | 215.9 |
| Standard Deviation | 6.8 | 7.1 | 7.2 | 7.3 | 8.0 | 8.5 | 9.2 | 9.9 |

As is evident, the experimental rats on the dieth containing the methyl ester of L-aspartyl-L-phenylalanine evidenced significant increases in body weight beginning with the seventh day of the experiment, and after 2 weeks the mean body weight of the experimental group was about 34 percent higher than the mean body weight of the control group. Taking into account the observed standard deviations, this represents an increase over control levels of over 27 percent.

What is claimed is:

1. A method for stimulating the rate of growth of an animal comprising administering to said animal the methyl ester of aspartyl-phenylalanine in an amount sufficient to stimulate said rate of growth.

2. A method according to claim 1 wherein said ester is admixed with the feed for said animal.

3. A method according to claim 2 wherein said animal is selected from the group consisting of cattle and swine.

4. A method according to claim 2 wherein said feed contains from about 0.01 to about 1 weight percent of said ester.

5. A method according to claim 2 wherein said ester is the methyl ester of L-aspartyl-L-phenylalanine.

* * * * *